(12) United States Patent
Ohnishi (10) Patent No.: US 11,198,254 B2
(45) Date of Patent: Dec. 14, 2021

(54) HEAT SEAL DEVICE

(71) Applicant: Totani Corporation, Kyoto (JP)

(72) Inventor: Yuji Ohnishi, Kyoto (JP)

(73) Assignee: Totani Corporation, Kyoto (JP)

( * ) Notice: Subject to any disclaimer, the term of this patent is extended or adjusted under 35 U.S.C. 154(b) by 0 days.

(21) Appl. No.: 17/054,317

(22) PCT Filed: Apr. 23, 2019

(86) PCT No.: PCT/JP2019/017252
§ 371 (c)(1),
(2) Date: Nov. 10, 2020

(87) PCT Pub. No.: WO2019/225266
PCT Pub. Date: Nov. 28, 2019

(65) Prior Publication Data
US 2021/0086453 A1    Mar. 25, 2021

(30) Foreign Application Priority Data

May 21, 2018    (JP) .............................. JP2018-097210

(51) Int. Cl.
*B29C 65/20*    (2006.01)
*B29C 65/78*    (2006.01)
*B29C 65/00*    (2006.01)
*B29L 31/00*    (2006.01)

(52) U.S. Cl.
CPC .......... *B29C 65/20* (2013.01); *B29C 65/7894* (2013.01); *B29C 66/432* (2013.01); *B29C 66/8511* (2013.01); *B29L 2031/7128* (2013.01)

(58) Field of Classification Search
CPC ... B29C 65/20; B29C 65/7894; B29C 66/432; B29C 66/8511; B29L 2031/7128
See application file for complete search history.

(56) References Cited

U.S. PATENT DOCUMENTS

2016/0122061 A1*    5/2016    Radzanowski ......... B65B 59/02
493/194

FOREIGN PATENT DOCUMENTS

| JP | 2009-208835 A | 9/2009 |
| JP | 2011-073696 A | 4/2011 |

OTHER PUBLICATIONS

International Search Report dated Jun. 8, 2019 by the International Searching Authority (Japan Patent Office) in PCT Application PCT/JP2019/017252.

* cited by examiner

*Primary Examiner* — Daniel McNally
(74) *Attorney, Agent, or Firm* — NovoTechIP International PLLC (57) ABSTRACT

A head seal device of a bag making apparatus includes a pair of seal units configured to face each other in a facing direction. Each of the seal units includes a heat seal member and a heater. The heat seal device includes an adjustment unit configured to move the first seal unit in a width direction of continuous sheet panels, and to move the second seal unit in the width direction of the sheet panels in accordance with movement of the first seal unit in the width direction.

9 Claims, 10 Drawing Sheets

HEAT SEAL DEVICE

TECHNICAL FIELD

The present invention relates to a heat seal device for being disposed in a bag making apparatus.

BACKGROUND

Several bag making apparatuses for making plastic bags have been developed. Such a bag making apparatus, for example, superposes at least two continuous sheet panels on each other and intermittently feeds them in their longitudinal direction. The bag making apparatus heat-seals the sheet panels in their longitudinal direction and width direction during every intermittent feed cycle of the sheet panels. Subsequently, the bag making apparatus cross-cuts the sheet panels in the width direction during every intermittent feed cycle of the sheet panels. Thereby, the bag making apparatus makes the plastic bags.

Figure 9A:
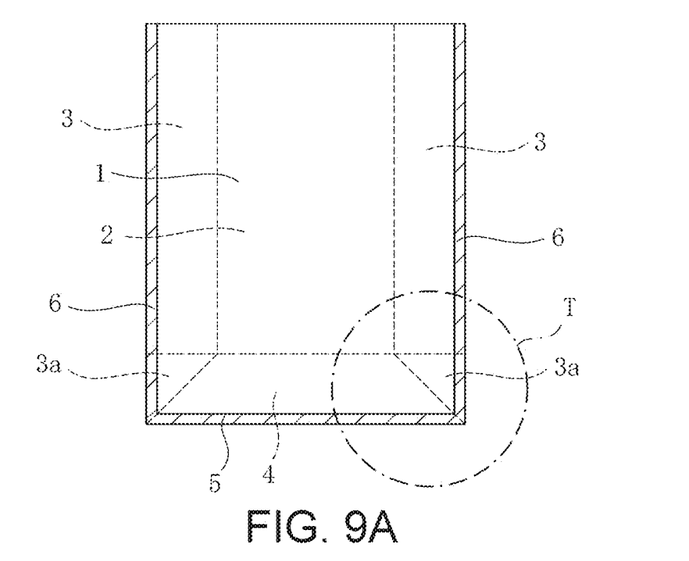
FIG. 9A is a view of a plastic bag.

A plastic bag illustrated in FIG. 9A includes sheet panels 1 and 2 superposed on each other. Side gussets 3 and a bottom component 4 are interposed between the sheet panels 1 and 2. Each of the side gussets 3 is folded in half. One end of the side gusset 3 is folded in half and interposed between the two layers of the side gusset 3, so that an auxiliary gusset 3a is formed. The bottom component 4 is also folded in half.

In making this plastic bag, the sheet panels 1 and 2 and the bottom component 4 are heat-sealed, so that a sealed part 5 is formed. The sheet panels 1 and 2, the side gusset 3 and the bottom component 4 are heat-sealed, so that sealed parts 6 are formed.

Figure 9B:
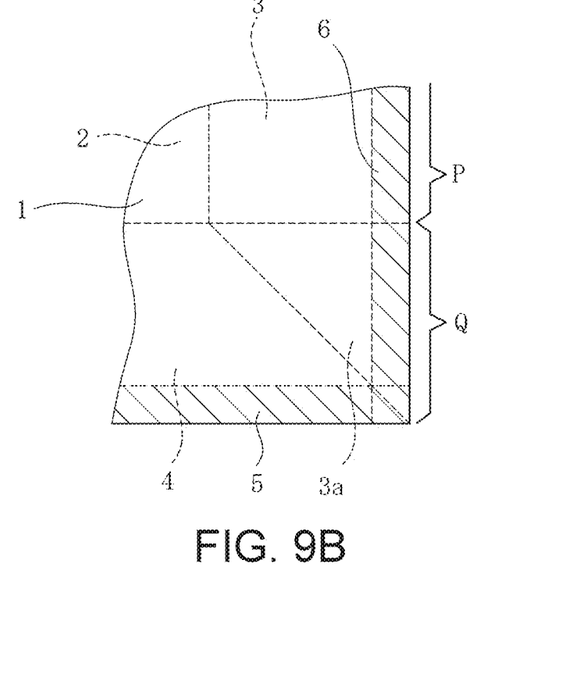
FIG. 9B is an enlarged view of a region T in FIG. 9A.

FIG. 9B illustrates a region T in FIG. 9A. The section P of the sealed part 6 consists of the sheet panels 1 and 2 and the side gusset 3 folded in half. In other words, four films are stacked in the section P. On the other hand, the section Q of the sealed part 6 consists of not only the sheet panels 1 and 2 and the side gusset 3 but also the auxiliary gusset 3a folded in half and the bottom gusset 4 folded in half. In other words, eight films are stacked in the section Q. Thus, heat-sealing only once can result in insufficient heat seal strength of the section Q.

Like this, the number of films (thickness of films) to be heat-sealed can be different from section to section. As a result, the strength of the sealed part is partially weak.

For example, the bag making apparatus of Patent document 1 includes a plurality of the cross heat seal devices disposed to be spaced from each other in the longitudinal direction of the continuous sheet panels, and heat-seals a same area of the films several times using these cross heat seal devices to form the cross sealed part. This reinforces the strength of the cross sealed part.

For example, the specific cross heat seal device among the cross seal devices can heat-seal only a section required to be reinforced. For example, in forming the sealed part 6 of FIG. 9A, some cross seal device heat-seals only the section Q to reinforce the heat seal strength of the section Q.

Partially heat-sealing is not intended only for a reinforcement purpose. The shapes of the plastic bags have been diversified. For this diversification, some heat seal devices can heat-seal only a specific section of the plastic bag.

The heat seal device typically includes a pair of heat seal members and heaters for heating the respective heat seal members, and sandwiches the sheet panels, and optionally for example the side gusset and/or the bottom component between the pair of heat seal members so as to heat and pressurize them.

The position of the pair of heat seal members should be adjusted with respect to the sheet panels before the bag making apparatus is operated. Design is often printed on the sheet panels. Misalignment of the sealed part formed using the heat seal members with respect to the design can make the plastic bag look bad.

Figure 10:
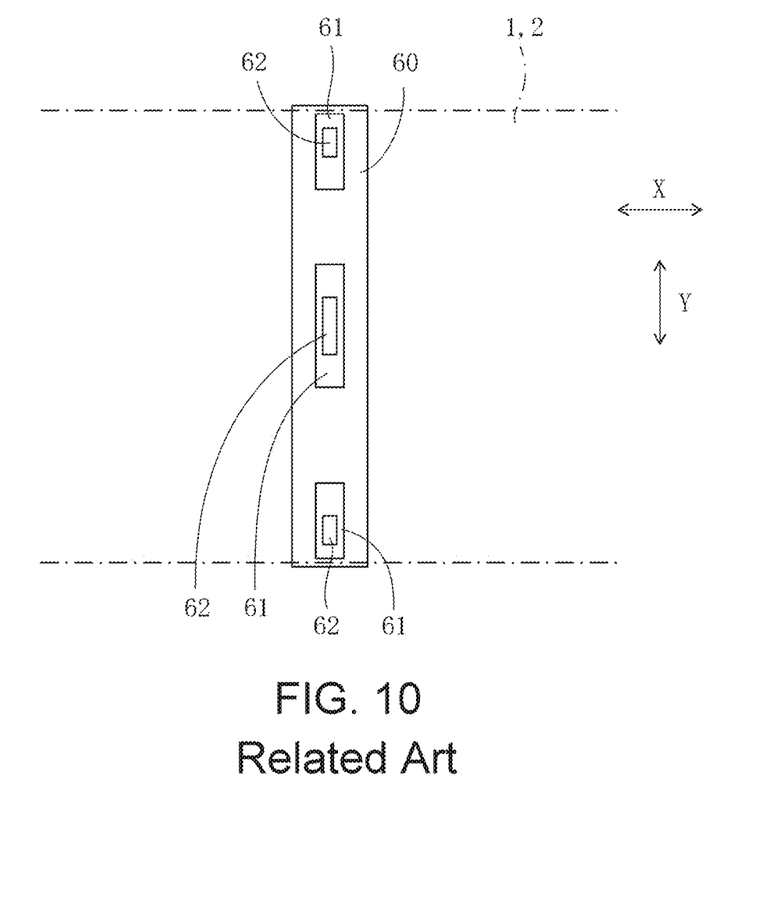
FIG. 10 illustrates positional adjustment of heat seal members according to the related art.

FIG. 10 schematically illustrates an arrangement for positional adjustment of heat seal members according to the related art. Heater 60 is arranged in the width direction Y of the sheet panels 1 and 2. Bases 61 are attached to the heater 60. Heat seal members 62 are attached to the respective bases 61 slidably in the width direction Y of the sheet panels 1 and 2 to face the sheet panels 1 and 2. The heat seal members 62 are heated by the heater 60.

An operator slides the heat seal members 62 on the bases 61 to position them, and fixes them to the bases 61 with bolts. In the case where the positions of the heat seal members 62 are required to be largely moved, the operator first removes the bases 61 from the heater 60 and attaches the bases 61 to different positions on the heater 60. Then, the operator positions the heat seal members 62 on the bases 61, thereby adjusting the positions of the heat seal members 62 with respect to the sheet panels 1 and 2.

With the sheet panels set between the pair of heat seal members, the operator adjusts the position of first heat seal member as described above, and then also adjusts the position of the second heat seal member as described above. At this time, the position of at least one of the heat seal members can fail to be properly adjusted. Due to this, the operator can have to access the pair of heat seal members many times to fine-adjust the positions of these members.

Like this, the position of the pair of heat seal members has to be separately adjusted with respect to the sheet panels, which represents a significant burden on the operator.

CITATION LIST

Patent Document

Patent document 1: Japanese Unexamined Patent Application Publication No. 2011-73696

SUMMARY

According to an aspect of the invention, there is provided a heat seal device for being disposed in a bag making apparatus and for heat-sealing at least two continuous sheet panels. The bag making apparatus is configured to feed the sheet panels in a longitudinal direction of the sheet panels and to make the plastic bags from the sheet panels. The heat seal device includes a pair of a first seal unit and a second seal unit configured to face each other in a facing direction perpendicular to a feed direction of the sheet panels. Each of the first and second seal units includes a heat seal member and a heater for heating the heat seal member. The heat seal device further includes a drive unit configured to move at least one of the first seal unit or the second seal unit in the facing direction to sandwich the sheet panels between the heat seal member of the first seal unit and the heat seal member of the second seal unit. The heat seal device further incudes an adjustment unit supporting the pair of the first and second seal units movably in a width direction of the sheet panels perpendicular to the feed and facing directions, the adjustment unit being configured to move the first seal unit in the width direction of the sheet panels and to move the second seal unit in the width direction of the sheet panels in accordance with movement of the first seal unit in the width direction of the sheet panels.

The adjustment unit may further be configured to be switchable between a first state and a second state. The adjustment unit may be configured to move the second seal unit in accordance with the movement of the first seal unit when in the first state and not to move the second seal unit in accordance with the movement of the first seal unit when in the second state.

The adjustment unit may further be configured to move the second seal unit in a same direction as the first seal unit and by a same distance as the first seal unit in accordance with the movement of the first seal unit.

The adjustment unit may include: a first shaft rotatably supported and extending in the width direction of the sheet panels; a first mounting bracket attached to the first seal unit and having a first female thread engaged with a first male thread formed on the first shaft; a second shaft rotatably supported and extending in parallel with the first shaft; and a second mounting bracket attached to the second seal unit and having a second female thread engaged with a second male thread formed on the second shaft.

The adjustment unit may further include a relay shaft connected at a first end thereof to the first shaft via a first pair of bevel gears and connected at a second end thereof to the second shaft via a second pair of bevel gears.

The first shaft may include: a base part on which the first male thread is formed; and a movable part on which a bevel gear of the first pair is mounted. The movable part may be connected to the base part via a first bearing to be movable with respect to the base part between a first position where the first pair of the bevel gears is engaged with each other and a second position where the first pair of the bevel gears is disengaged from each other. The movable part and the first bearing may be configured such that the movable part is rotatable together with the base part when the movable part is located in either the first position or the second position.

The adjustment unit may further include a handle for being operated to rotate the first shaft.

The adjustment unit may further include a positioning spring disposed to bias the movable part toward the first position.

The relay shaft may include: a first end part on which a bevel gear of the first pair is mounted; a second end part on which a bevel gear of the second pair is mounted; an intermediate part located between the first end part and the second end part; a first universal joint joining the first end part to the intermediate part; and a second universal joint joining the second end part to the intermediate part.

The relay shaft and the second shaft may be disposed to be moved by the drive unit in the facing direction with respect to the first shaft. A bevel gear of the first pair may be connected to the relay shaft via a relay bearing which is disposed not to be moved by the drive unit. The relay shaft and the relay bearing may be configured such that the relay shaft is rotatable together with the bevel gear of the first pair when the relay shaft is located in any position within a range of movement thereof.

DETAILED DESCRIPTION

With reference to the drawings, a heat seal device according to implementations of the present invention will be described below. The heat seal device is disposed in a bag making apparatus. Direction X, direction Y and direction Z are perpendicular to each other.

Figure 1:
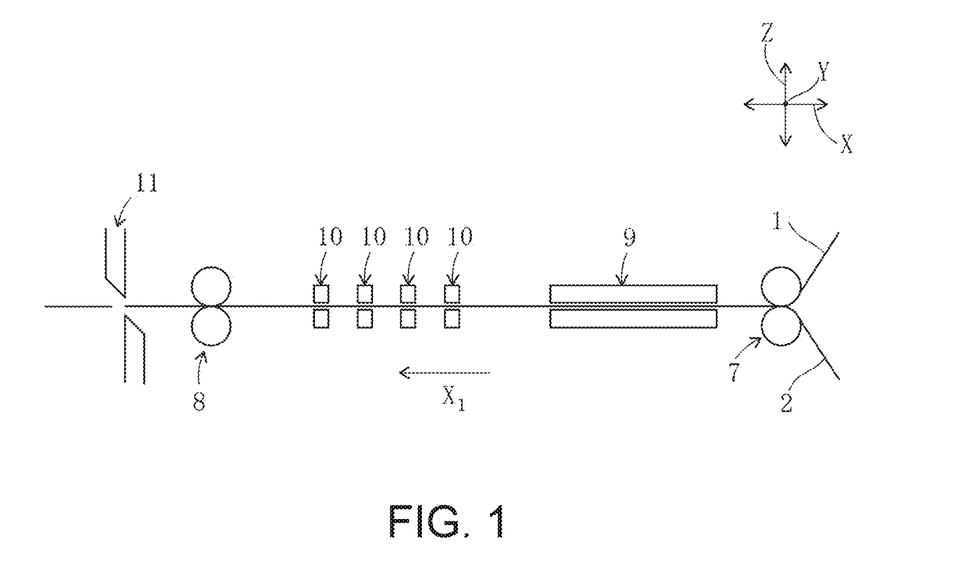
FIG. 1 is a schematic side view of a bag making apparatus.

FIG. 1 illustrates a bag making apparatus for making plastic bags. The bag making apparatus superposes at least two continuous sheet panels 1 and 2 on each other using a pair of guide rollers 7, and intermittently feeds the sheet panels 1 and 2 using a pair of conveying rollers 8. The feed direction $X_1$ corresponds to the longitudinal direction X (continuous direction) of the sheet panels 1 and 2. Before superposing of the sheet panels 1 and 2, the bag making apparatus supplies the side gussets 3 (FIG. 9A and FIG. 9B) to the sheet panel 1 or 2 using a supply device (not shown) to arrange the side gussets 3 in the width direction Y of the sheet panels 1 and 2 so that the side gussets 3 are interposed between the sheet panels 1 and 2 when the sheet panels 1 and 2 are superposed on each other. The bag making apparatus further supplies the bottom component 4 (FIG. 9A and FIG. 9B) to the sheet panels 1 and 2 using an additional supply device (not shown). The sheet panels 1 and 2, the side gussets 3 and the bottom component 4 are plastic films.

The bag making apparatus includes a plurality of longitudinal heat seal devices 9 (only one of which is illustrated in FIG. 1) disposed to be spaced from each other in the width direction Y of the sheet panels 1 and 2. The sheet panels 1 and 2 and the bottom component 4 are heat-sealed by the longitudinal heat seal device 9 during every intermittent feed cycle of the sheet panels 1 and 2, so that the sealed part 5 (FIG. 9A and FIG. 9B) is formed.

The bag making apparatus further includes a plurality of cross heat seal devices 10 disposed to be spaced from each other in the longitudinal direction X of the sheet panels 1 and 2. The sheet panels 1 and 2, the side gussets 3 and the bottom component 4 are heat-sealed by the cross heat seal devices 10 during every intermittent feed cycle of the sheet panels 1 and 2, so that the sealed parts 6 (FIGS. 9A and 9B) are formed.

The bag making apparatus further includes a cross cut device 11 that cross-cuts the sheet panels 1 and 2, the side gusset 3 and the bottom component 4 in the width direction Y of the sheet panels 1 and 2 during every intermittent feed cycle of the sheet panels 1 and 2. The cut position is the position of the sealed part 6. Thereby, the bag making apparatus makes the plastic bags from the sheet panels 1 and 2, the side gussets 3 and the bottom component 4. The bag making apparatus may make the plastic bags from only the sheet panels 1 and 2.

At least one of the cross heat seal devices 10 incorporated into the bag making apparatus is a heat seal device according to the implementations of the present invention.

Figure 2:
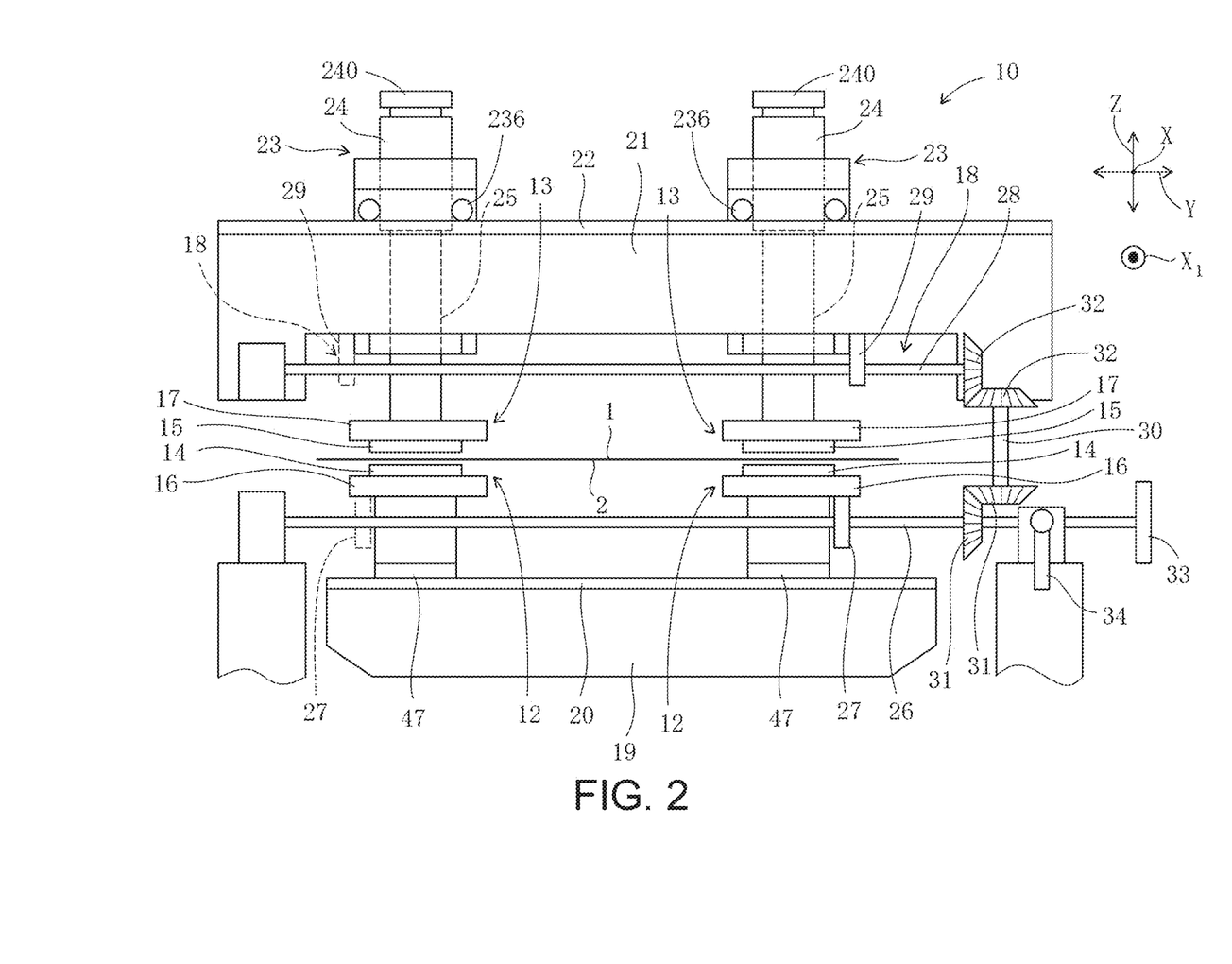
FIG. 2 is a schematic view of a downstream side of a heat seal device with respect to a sheet panel feed direction.

As illustrated in FIG. 2, a heat seal device 10 includes at least one pair of the seal units 12 and 13 configured to face each other in a facing direction Z which is perpendicular to the feed direction $X_1$ of the sheet panel 1. In the implementation, the facing direction Z is a vertical direction. Therefore, the longitudinal direction X and the width direction Y are the horizontal directions. The sheet panels 1 and 2 are set between the pair of seal units 12 and 13. The sheet panels 1 and 2 are intermittently fed between the pair of seal units 12 and 13 in the direction $X_1$ (the front direction on paper) by the bag making apparatus. A plurality of pairs (two pairs in the implementation) of the seal units 12 and 13 are provided and arranged in the width direction Y of the sheet panels 1 and 2.

Each of the seal units 12 and 13 includes a heat seal member 14, 15 and a heater 16, 17 for heating the heat seal member 14, 15.

Each of the heat seal members 14 and 15 is detachably attached to the heater 16, 17 to be opposed to a feed plane for the sheet panels 1 and 2. Therefore, when the sheet panels 1 and 2 are intermittently fed in the direction $X_1$ by the bag making apparatus, the heat seal members 14 and 15 face the sheet panels 1 and 2.

Each of the heaters 16 and 17 includes a heater cartridge therein. Supplying electric power to the heater cartridge makes the heater cartridge generate heat. The heat is transmitted to the heat seal member 14, 15.

The heat seal device 10 further includes adjustment units 18 each of which supports the pair of seal units 12 and 13 movably in the width direction Y of the sheet panels 1 and 2 perpendicular to the feed and facing directions $X_1$ and Z, and is configured to move the seal units 12 and 13 in the width direction Y. The adjustment unit 18 is provided for each pair of the seal units 12 and 13. The main components of the adjustment unit 18 for the seal units 12 and 13 on the right side in FIG. 2 are arranged downstream side (front side in FIG. 2 on the paper) with respect to the direction $X_1$, and thus clearly illustrated in FIG. 2. On the other hand, the main components of the adjustment unit 18 on the left side in FIG. 2 are arranged upstream side (back side in FIG. 2 on paper) with respect to the direction $X_1$, and thus rarely illustrated in FIG. 2. The structures of the two adjustment units 18 are substantially the same as each other. Thus, the adjustment unit 18 on the right side will be described in detail whereas the description of the adjustment unit 18 on the left side will be largely omitted.

The adjusting unit 18 includes a first rail 20 attached to a lower first support frame 19 to extend in the width direction Y of the sheet panels 1 and 2, and a second rail 22 attached to an upper second support frame 21 to extend in parallel with the first rail 20. The support frames 19 and 21 and the rails 20 and 22 are shared by the two adjustment units 18. The lower seal unit 12 is movable along the first rail 20, for example using a slider 47. The upper seal unit 13 includes a guide arrangement 23, and is movable along the second rail 22 using the guide arrangement 23.

Figure 3:
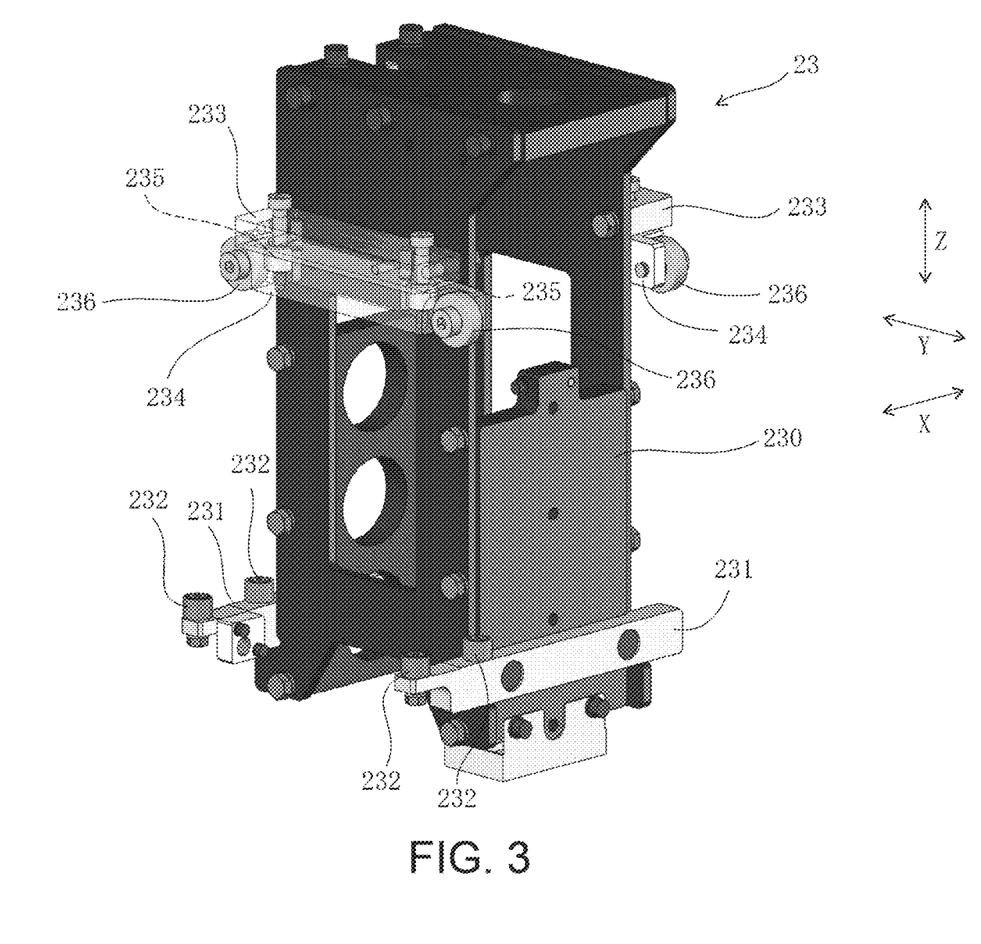
FIG. 3 is a perspective view of a guide arrangement.

FIG. 3 illustrates the guide arrangement 23. Frame guides 231 are fixed to a lower section of a heater frame 230. A pair of guide rollers 232 is supported by each of the frame guides 231. The pair of guide rollers 232 is disposed to be spaced from each other for sandwiching the upper second support frame 21 (FIG. 2). The upper surface of each frame guide 231 has a section that contacts the second support frame 21. This section has been processed to be smooth, and thus its surface roughness is fine.

The bases 233 are fixed to the upper section of the heater frame 230. A bracket 234 is supported by each of the bases 233 movably in the vertical direction Z. The bracket 234 is biased downward by floating springs 235. Rolling rollers 236 are supported by the bracket 234. The rolling rollers 236 are placed on the second rail 22 (FIG. 2) to be able to roll on the second rail 22. The biasing force of the floating springs 235 has been adjusted so that the frame guides 231 can slide relative to the second support frame 21 with reaction force acting between the upper surfaces of the frame guides 231 and the lower surfaces of the second support frame 21 to some extent.

As illustrate in FIG. 2, a cylinder 24 and a linkage 25 are arranged in each of the guide arrangements 23. The cylinder 24 is supported by the heater frame 230 (FIG. 3) so that its piston rod can reciprocate in the vertical direction Z. The linkage 25 connects the piston rod of the cylinder 24 to the heater 17. These 24 and 25 are used to pressurize the sheet panels 1 and 2 using the heat seal member 15. The cylinder 24 includes an adjustment knob 240 for adjusting the stroke end of its piston rod.

As illustrated in FIG. 2, the adjustment unit 18 further includes a first shaft 26 rotatably supported by the first support frame 19 and extending in the width direction Y of the sheet panels 1 and 2, and a first mounting bracket 27 attached to the lower seal unit 12 (e.g., its heater 14 or its slider 47). The first mounting bracket 27 has a first female thread which is engaged with a first male thread formed on the outer circumferential surface of the first shaft 26. The adjustment unit 18 further includes a second shaft 28 rotatably supported by the second support frame 21 and extending in parallel with the first shaft 26, and a second mounting bracket 29 attached to the upper seal unit 13 (e.g., its heater frame 230). The second mounting bracket 29 has a second female thread which is engaged with a second male thread formed on the outer circumferential surface of the second shaft 28.

The adjustment unit 18 further includes a relay shaft 30 extending in the facing direction Z. The relay shaft 30 is connected at first end thereof to the first shaft 26 via a first pair of bevel gears 31 and connected at the second end thereof to the second shaft 28 via a second pair of bevel gears 32.

The adjustment unit 18 further includes a handle 33 for being operated to rotate the first shaft 26 and that is connected to the first shaft 26. Rotating the first shaft 26 by means of operation of the handle 33 causes the first mounting bracket 27 to move along the first shaft 26. As a result, the seal unit 12 moves in the width direction Y of the sheet panels 1 and 2. The first shaft 26, the second shaft 28, the relay shaft 30, the handle 33, and their related components for the adjustment unit 18 on the left side in FIG. 2 are arranged on the upstream side (back side in FIG. 2 on paper) with respect to the direction $X_1$.

Since the relay shaft 30 is connected to the first shaft 26 and the second shaft 28 via the bevel gears 31 and 32, rotation of the first shaft 26 causes the relay shaft 30 and the second shaft 28 to also rotate. This causes the second mounting bracket 29 to move along the second shaft 28. As a result, the seal unit 13 moves in the same direction as the seal unit 12 and by the same distance as the seal unit 12 in accordance with the movement of the seal unit 12. In this way, the pair of seal units 12 and 13 is moved in unison by the adjustment unit 18 in the width direction Y of the sheet panels 1 and 2.

In the implementation, the adjustment unit 18 is configured to be switchable between a first state in which the adjustment unit 18 moves the seal unit 13 in accordance with the movement of the seal unit 12 as described above, and a second state in which the adjustment unit 18 does not move the seal unit 13 in accordance with the movement of the seal unit 12. The configuration for this will be described below.

Figure 4:
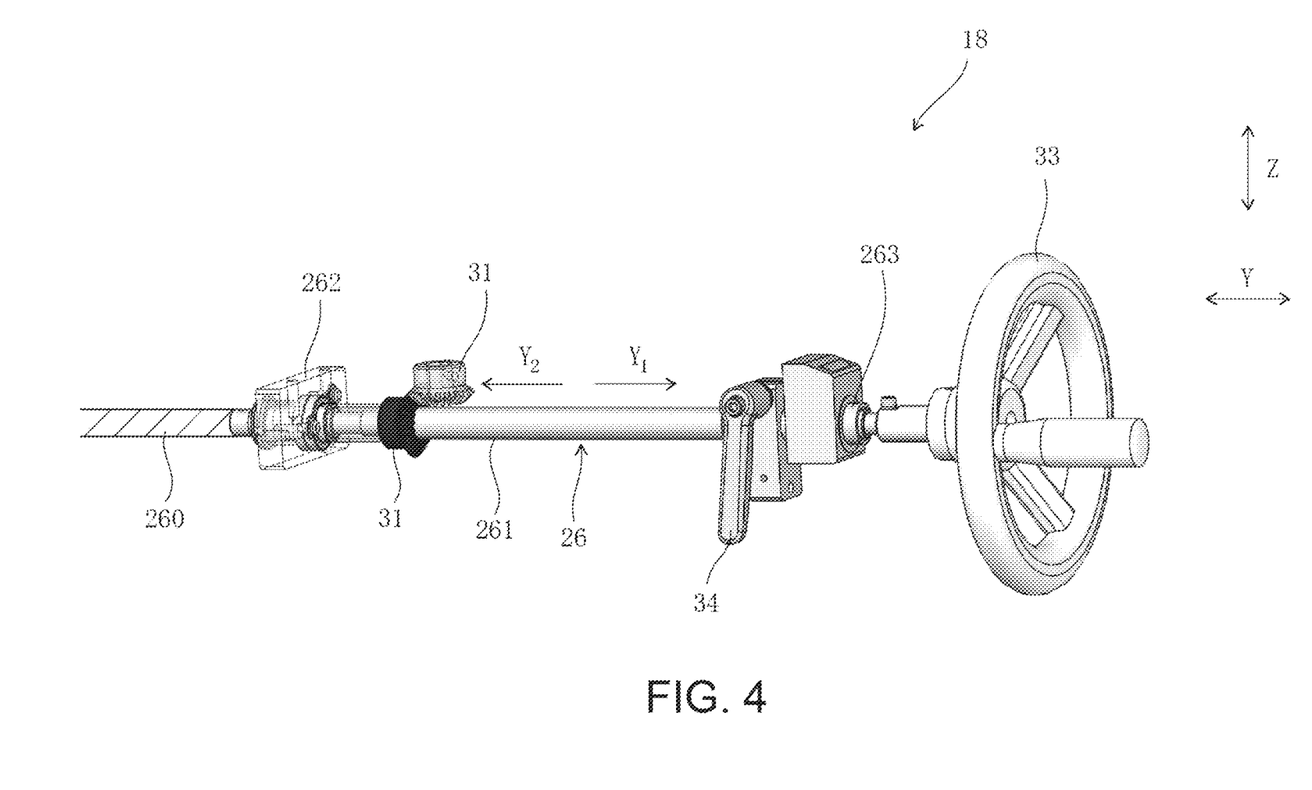
FIG. 4 is a partial perspective of an adjustment unit.

As illustrated in FIG. 4, the first shaft 26 includes a base part 260 on which the first male thread is formed, and a movable part 261 on which a bevel gear 31 of the first pair is mounted. The movable part 261 is connected to the base part 260 via a first bearing 262 to be movable in the axial direction Y thereof (which is in the width direction of the sheet panels) with respect to the base part 260. Thus, the movable part 261 can move between a first position where the first pair of the bevel gears 31 and 31 are engaged with each other as illustrated in FIG. 4, and a second position where the first pair of the bevel gears 31 and 31 are disengaged from each other. The movable part 261 and the first bearing 262 are configured such that the movable part 261 is rotatable together with the base part 260 when the movable part 26 is located in either the first position or the second position. For example, the first bearing 262 has a sleeve with a key groove, and the movable part 261 has a key on the outer circumferential surface thereof, the key being shaped to fit into the key groove.

The movable part 261 is connected to the handle 33 via the second bearing 263 to rotate together with the handle 33 and to move together with the handle 33 in the axial direction Y. Thus, an operator can move the movable part 261 between the first position and the second position by grasping the handle 33 and then moving it in the axial direction Y.

When the movable part 261 is located in the first position in FIG. 4, the pair of seal units 12 and 13 move in unison in the width direction Y of the sheet panels 1 and 2 by means of operation of the handle 33 as described above. This means that the adjustment unit 18 is in the first state when the movable part 261 is located in the first position.

When the movable part 261 is located in the second position, the first shaft 26 rotates by means of operation of the handle 33. However, since the first pair of the bevel gears 31 and 31 is not engaged with each other, the relay shaft 30 and the second shaft 28 fail to rotate. Therefore, the seal unit 12 moves in the moving direction Y, whereas the seal unit 13 fails to move. This means that the adjustment unit 18 is in the second state when the movable part 261 is located in the second position.

A positioning spring (not shown) is disposed in the first bearing 262 to bias the movable part 261 in the direction $Y_1$ toward the first position. Thus, the bevel gear 31 of the first pair on the first shaft 26 is biased by the positioning spring toward the bevel gear 31 of the first pair on the relay shaft 30. A lock lever 34 is disposed to releasably lock the rotation and movement of the movable part 261 and thus to releasably fix the positions of the seal units 12 and 13.

In order to fine-adjust the relative positions of the seal unit 12 and the seal unit 13 using the adjustment unit 18, the movable part 261 is first moved by an operator in the direction $Y_2$ from the first position to the second position against the positioning spring, thereby disengaging the first pair of the bevel gears 31 and 31 from each other. Then, by means of operation of the handle 33 in that state, the seal unit 12 is moved with respect to the seal unit 13, so that the relative positions of the seal units 12 and 13 are fine-adjusted. Subsequently, the movable part 261 is biased by the positioning spring in the direction $Y_1$ to be returned to the first position. At this time, the teeth of the bevel gears 31 and 31 may collide with each other, and as a result, the bevel gears 31 and 31 may fail to be engaged with each other. In this case, operating the handle 33 slightly, combined with the biasing force of the positioning spring, causes the bevel gears 31 and 31 to be engaged with each other.

Figure 5:
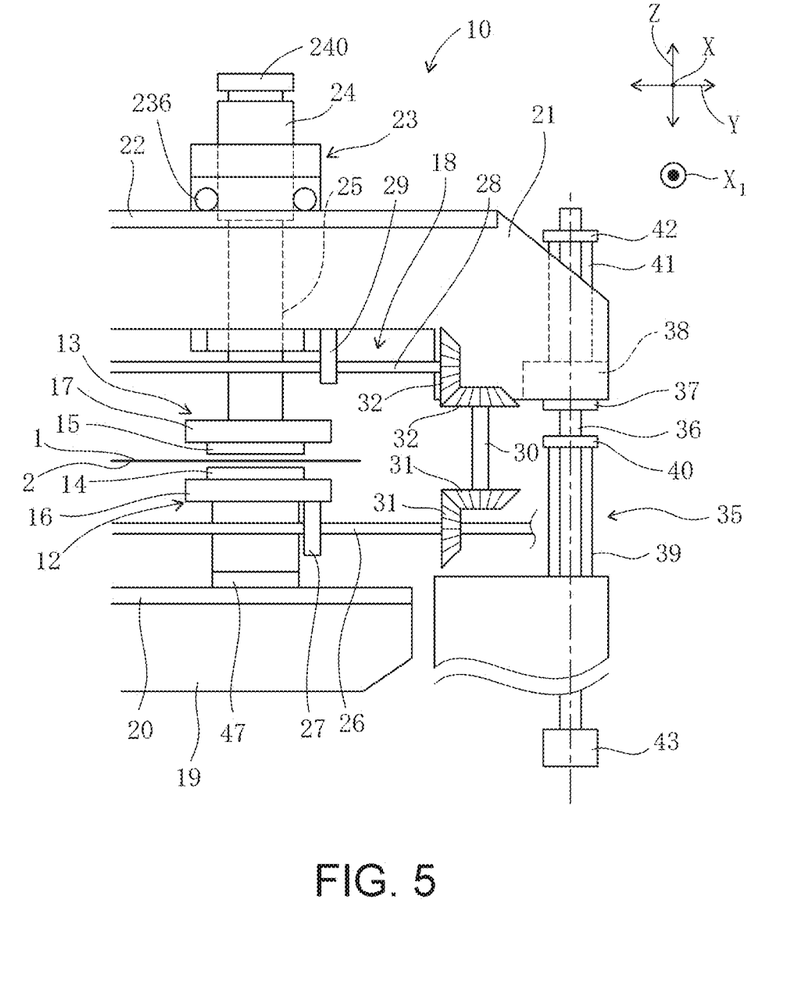
FIG. 5 is a schematic view of a downstream side of a drive unit with respect to a sheet panel feed direction.

As illustrated in FIG. 5, the heat seal device 10 further comprises a drive unit 35 configured to move at least one of the seal units 12 or 13 in the facing direction Z to sandwich the sheet panel 1 and 2 between the heat seal members 14 and 15. The drive unit 35 in the implementation is configured to move the upper seal unit 13 toward and away from the lower seal unit 12. The drive unit 35 will be described below.

The pole 36 extends in the vertical direction Z (facing direction). The pole 36 has a stepped surface. A receiving ring 37 is mounted on the pole 36 and is located on the stepped surface. A frame block 38 is held in the second support frame 21 and sandwiched by the second support frame 21 so that the frame block 38 and the second support frame 21 can move in unison. The pole 36 is inserted through a through hole in the frame block 38. The frame block 38 is placed on the receiving ring 37.

A floating spring 39 is arranged to bias the pole 36 upward. A floating adjustment nut 40 is mounted on the pole 36 for adjusting the biasing force of the floating spring 39. A charge spring 41 is arranged on the frame block 38. A charge adjustment nut 42 is mounted on an upper end of the pole 36 for adjusting the biasing force of the charge spring 41. The charge spring 41 is located between the charge adjustment nut 42 and the frame block 38 to bias the frame block 38 toward the receiving ring 37.

A pole joint 43 is attached to the lower end of the pole 36. The bag making apparatus includes a link mechanism that interconnects the respective devices of the bag making apparatus. The corresponding joint of the link mechanism is coupled to this pole joint 43. This allows the pole 36 to move vertically in conjunction with the intermittent feed of the sheet panels 1 and 2.

As the pole 36 moves downward while compressing the floating spring 39, the frame block 38, the second support frame 21 and the two seal units 12 and 13 also move downward together with the pole 36. Therefore, the heat seal member 15 approaches the heat seal member 14. This causes the sheet panel 1 and 2 to be sandwiched between the heated heat seal members 14 and 15.

The pole 36 further moves downward together with the frame block 38. On the other hand, the upper seal unit 13 fail to further move downward together with the pole 36 since the heat seal member 15 has already been pressed against the heat seal member 14. At this time, the cylinder 24 is contracted. The press pressure (air pressure) of the cylinder 24 is transferred as heat seal pressure to the sheet panels 1 and 2 through the linkage 25, the heater 17 and the heat seal member 15. Thereby, the sheet panels 1 and 2 are pressurized by the heat seal members 14 and 15.

Subsequently, as the pole 36 moves upward, the respective components that have moved downward together with the pole 36 move upward to return to their initial positions. Therefore, the heat seal member 15 is separated from the heat seal member 14. In this way, the sheet panels 1 and 2, and optionally the side gusset 3 and the bottom component 4 which are incorporated into the sheet panels 1 and 2, are heat-sealed by the heat seal device 10 during every intermittent feed cycle thereof.

Figure 6:
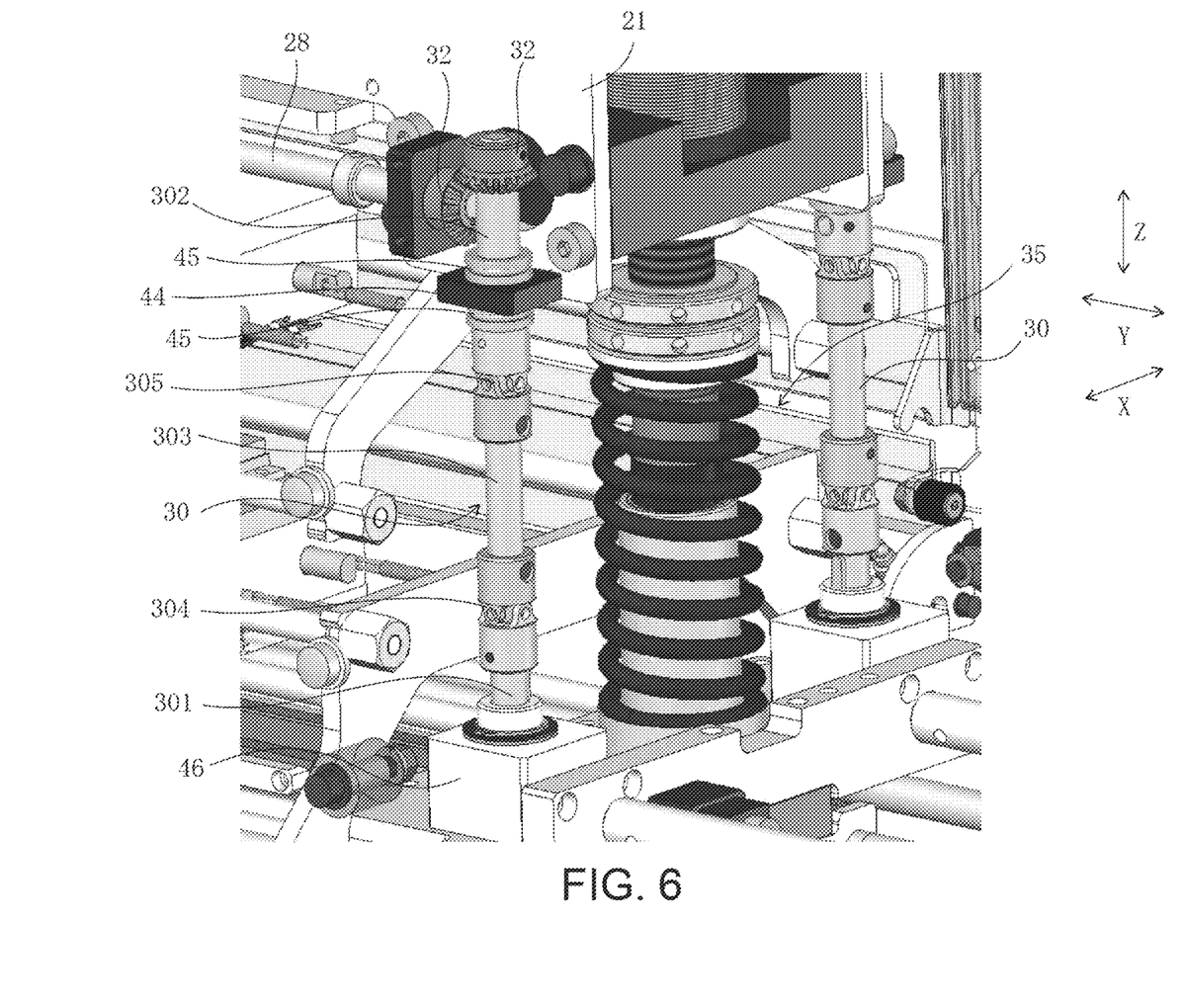
FIG. 6 is a perspective view of a relay shaft.

FIG. 6 illustrates in detail the relay shaft 30 in the implementation. A support block 44 is fixed to the second support frame 21 to rotatably receive the relay shaft 30. Thrust bearings 45 are disposed on both sides of the support block 44 with respect to the vertical direction Z to rotatably receive the relay shaft 30. This allows the relay shaft 30 to rotate smoothly around the axis thereof while being fixed in vertical direction Z with respect to the support block 44. A relay bearing 46 is held by the main frame so as not to be moved in the vertical direction Z by the drive unit 35. The relay bearing 46 rotatably receives the relay shaft 30. Therefore, the second shaft 28 and the relay shaft 30 move together with the seal unit 13 when the drive unit 35 moves the seal unit 13 in the vertical direction Z. On the contrary, the relay bearing 46 fails to move together with the seal unit 13 since it is held by the first shaft 26 (FIG. 2) and the main frame.

Figure 7:
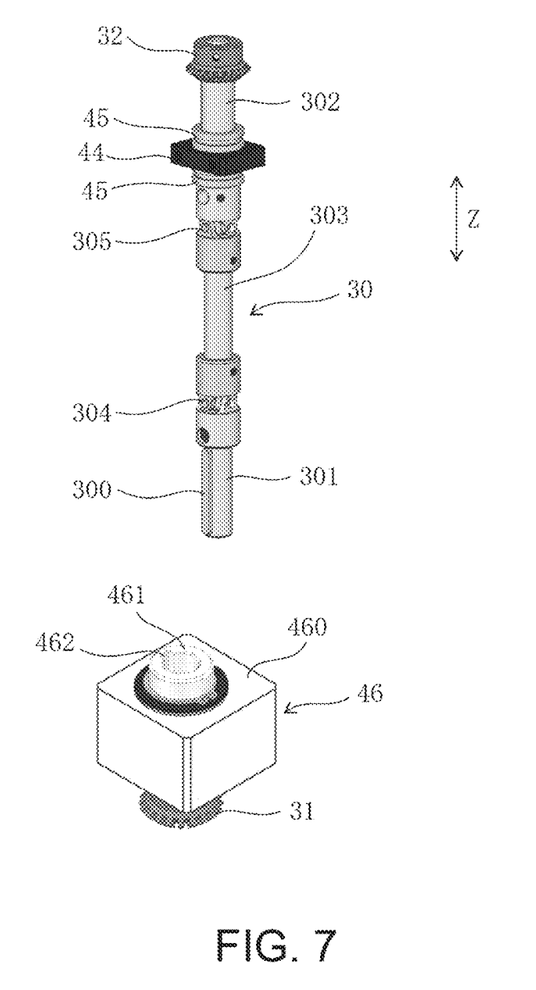
FIG. 7 is a perspective view of a relay shaft and a relay bearing in FIG. 6.

As illustrated in FIG. 7, the bevel gear 31 of the first pair is connected to the relay shaft 30 via the relay bearing 46. The relay bearing 46 and the relay shaft 30 are configured such that the relay shaft 30 is rotatable together with the bevel gear 31 of the first pair when the relay shaft 30 is located in any position in the range of movement thereof.

For example, the relay shaft 30 includes a key 300 on the outer surface thereof, the key 300 extending in the axial direction Z of the relay shaft 30 (which is the vertical direction and the facing direction). The relay bearing 46 includes a body part 460 and a sleeve 461 rotatably arranged in the body part 460. The sleeve 461 has a key groove 462 on the inner circumferential surface thereof, the key groove 462 extending in the axial direction Z of the relay shaft 30. The bevel gear 31 of the first pair is attached to the sleeve 461.

The relay shaft 30 is inserted into the relay bearing 46 such that the key 300 fits into the key groove 462. The lengths of the key 300 and the key groove 462 are designed to keep the key 300 from detaching from the key groove 462 when the relay shaft 30 is moved by the drive unit 35 in the vertical direction Z. This prevents a shift in phase between the first pair of the bevel gears 31 and the second pair of the bevel gears 32 during movement of the relay shaft 30 in the vertical direction Z.

As illustrated in FIG. 7, the relay shaft 30 includes a first end part 301 on which the bevel gear 31 of the first pair is mounted via the relay bearing 46, a second end part 302 on which the bevel gear 32 of the second pair is mounted, and an intermediate part 303 located between the first end part 301 and the second end part 302. The relay shaft 30 further includes a first universal joint 304 joining the first end 301 to the intermediate part 303, and a second universal joint 305 joining the second end 302 to the intermediate part 303. The universal joints 304 and 305 allow for the absorption of subtle positional shift of the second support frame 21 (FIG. 6) which is disposed to be moved in the vertical direction Z by the drive unit 35.

Based on the design of the plastic bags to be made, the pair of heat seal members 14 and 15 should be selected and adjusted in position with respect to the sheet panels 1 and 2. The method will be described below.

Figure 8:
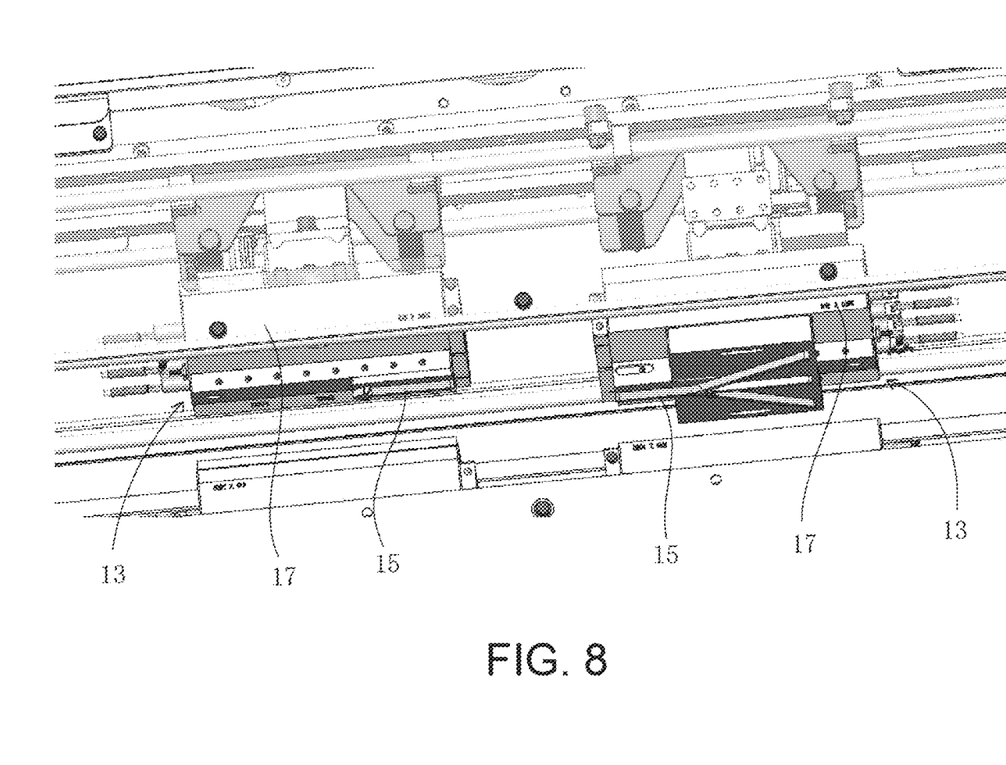
FIG. 8 is a perspective view of heat seal members and heaters.

The heaters 16 and 17 are at room temperature. An operator selects the heat seal members 14 and 15 based on the plastic bags to be made, and attaches them to the heaters 16 and 17. For example, as illustrated in FIG. 8, the heat seal member 15 is a heat seal bar which is used to heat-seal a specific section of the plastic bag. The corresponding heat seal member 14 is a receiving member having a surface that receives the entire heat seal bar 15, or a heat seal bar having the same shape as the heat seal bar 15.

The receiving member is typically constituted by a member with a lower hardness (such as silicone rubber) than the heat seal bar. The use of a low-hardness receiving member will result in a well-finished sealed part due to uniform sealing pressure. However, since low-hardness materials typically have low thermal conductivity, it is difficult to obtain sufficient seal strength depending on how heat is transferred. Therefore, using a pair of high-hardness heat seal bars can provide a higher strength heat seal than using a heat seal bar and a receiving member.

Subsequently, the relative position of the pair of heat seal members 14 and 15 is adjusted by the operator using the adjustment unit 18. The adjustment unit 18 is switched to the second state. In the implementation, the movable part 261 (FIG. 4) is moved from the first position to the second position, so that the adjustment unit 18 is switched from the first state to the second state. Then, the seal unit 12 is moved with respect to the seal unit 13 in the width direction Y of the sheet panels 1 and 2 by means of operation of the handle 33 (FIG. 4), so that the relative positions of the heat seal members 14 and 15 are adjusted. After the adjustment, the movable part 261 (FIG. 4) is returned from the second position to the first position by the biasing force of the positioning spring.

Subsequently, the sheet panels 1 and 2 are set in the heat seal device 10 such that they extend between the pair of seal units 12 and 13.

Subsequently, the position of the pair of seal units 12 and 13 is adjusted with respect to the sheet panels 1 and 2 using the adjustment unit 18. The adjusting unit 18 has been switched to the first state. In the implementation, the movable part 261 is located in the first position due to the biasing force of the positioning spring. Then, by means of the operation of the handle 33, the pair of seal units 12 and 13 moves in the width direction Y with respect to the sheet panels 1 and 2 which have been set. At this time, the operator only has to adjust the position of the heat seal member 15 with respect to the sheet panels 1 and 2. This is because when the seal unit 13 is moved, the seal unit 12 is also moved by the same distance as the seal unit 13 and in the same direction as the seal unit 13. Therefore, the position of the heat seal member 14 has been automatically adjusted with respect to the sheet panels 1 and 2.

The adjustment unit 18 eliminates the need for separately adjusting the positions of the heat seal members 14 and 15 with respect to the sheet panels 1 and 2, and facilitates the accurate positional adjustment of the heat seal members 14 and 15 with respect to the sheet panels 1 and 2. Therefore, the heat seal device 10 according to the present invention is suitable for heat-sealing only a specific section for purposes such as reinforcing the heat seal strength.

The adjustment unit 18 is configured to be switchable between the first state and the second state. This facilitates adjusting the relative positions of the heat seal members 14 and 15 without detaching these from the heaters 16 and 17.

The first and second shafts 26 and 28 extend over the entire width of the sheet panels 1 and 2, which enables the adjustment unit 18 to move the heat seal members 14 and 15 over the entire width of the sheet panels 1 and 2. Therefore, there is no need for the step of replacing the bases 61 of FIG. 10 from the heater 60.

In the case where the heat seal members 14 and 15 are used to only heat-seal a specific section, the heaters 16 and 17 may be shorter than the width of the sheet panels 1 and 2. As illustrated in FIG. 10, this eliminates the need for the heater 60 which is longer than the width of the sheet panels 1 and 2, and thus leads to reduction of power consumption.

Other implementations will be described below. The adjustment unit 18 may include a motor for rotating the first shaft 26 instead of the handle 33. The adjustment unit 18 further includes a mark sensor for detecting a mark on the sheet panel 1 or 2, and a controller connected to the mark sensor and the motor to control the motor. The controller controls the motor based on the detection signals from the mark sensor to move the pair of seal units 12 and 13 in unison to adjust the positions of the heat seal members 14 and 15 with respect to the sheet panels 1 and 2.

The adjustment unit 18 may not include the relay shaft 30, but may include motors which are provided for the respective first and second shafts 26 and 28 and each rotates the corresponding shaft 26, 28, and a controller connected to these motors to control these motors. First, the relative positions of the seal units 12 and 13 (heat seal members 14 and 15) are adjusted using the motors. Then, the sheet panels 1 and 2 is set. Then, the seal unit 13 is moved by the first motor of the motors such that the position of the heat seal member 15 is adjusted with respect to the sheet panels 1 and 2. The controller then controls the second motor of the motors based on the signals from the first motor to move the seal unit 12 by the same distance as the seal unit 13 and in the same direction as the seal unit 13. Thereby, both positions of the heat seal members 14 and 15 are adjusted with respect to the sheet panels 1 and 2.

The adjustment unit 18 may further include position sensors which are provided for the respective seal units 12 and 13 and each detects the absolute position of the corresponding heat seal member 14, 15. These position sensors are connected to the controller. The seal unit 13 is moved by the first motor such that the heat seal member 15 is adjusted with respect to the sheet panels 1 and 2. Then, the controller controls the second motor based on the signals from the first motor and the position sensors to move the seal unit 12, thereby adjusting the heat seal member 14 to the position corresponding to the heat seal member 15 which has already adjusted.

In each implementation in which at least one sensor is used, the positions of the heat seal members 14 and 15 can be corrected on a real time basis. For example, the positions of the heat seal members 14 and 15 with respect to the sheet panels 1 and 2 are detected using at least one sensor. If the positions of the heat seal members 14, 15 are misaligned with respect to the sheet panels 1 and 2, the controller drives the motor(s) at the timing when the sheet panels 1 and 2 are paused, so as to correct the positions of the heat seal members 14 and 15 with respect to the sheet panels 1 and 2.

The adjustment unit 18 may include a storage device that stores the positions of the seal units 12 and 13 in association with the shape of the plastic bag. In making plastic bags with first shapes, the positions of the seal units 12 and 13 at this time are stored in association with the first shape in the storage device. Subsequently, in making other plastic bags with the second shapes, the positions of the seal units 12 and 13 are changed. In making the previous plastic bags with the first shapes again, the bag-making conditions are input to the controller. The controller that has received the input regarding the bag making conditions refers to the storage device and, based on the detection signals from the position sensor(s), moves the seal units 12 and 13 to the positions associated with the first shape. This further facilitates the positional adjustment of the seal units 12 and 13.

Although preferable implementations are described above, the invention is not limited to the above implementations.

A heat seal device according to the present invention may be applied to not only the cross heat seal device 10 but also the longitudinal heat seal device 9.

What is claimed is:

1. A heat seal device for being disposed in a bag making apparatus and for heat-sealing at least two continuous sheet panels, the bag making apparatus being configured to feed the sheet panels in a longitudinal direction of the sheet panels and to make plastic bags from the sheet panels, the heat seal device comprising:
    a pair of a first seal unit and a second seal unit configured to face each other in a facing direction perpendicular to a feed direction of the sheet panels, each of the first and second seal units comprising a heat seal member and a heater for heating the heat seal member;
    a drive unit configured to move at least one of the first seal unit or the second seal unit in the facing direction to sandwich the sheet panels between the heat seal member of the first seal unit and the heat seal member of the second seal unit; and
    an adjustment unit supporting the pair of the first and second seal units movably in a width direction of the sheet panels perpendicular to the feed and facing directions, the adjustment unit being configured to move the first seal unit in the width direction of the sheet panels and to move the second seal unit in the width direction of the sheet panels in accordance with movement of the first seal unit in the width direction of the sheet panels, wherein:
    the adjustment unit is further configured to be switchable between a first state and a second state, and
    the adjustment unit is configured to move the second seal unit in accordance with the movement of the first seal unit when in the first state and not to move the second seal unit in accordance with the movement of the first seal unit when in the second state.

2. The heat seal device of claim 1, wherein the adjustment unit comprises:
    a first shaft rotatably supported and extending in the width direction of the sheet panels;
    a first mounting bracket attached to the first seal unit and having a first female thread engaged with a first male thread formed on the first shaft;
    a second shaft rotatably supported and extending in parallel with the first shaft; and
    a second mounting bracket attached to the second seal unit and having a second female thread engaged with a second male thread formed on the second shaft.

3. The heat seal device of claim 2, wherein the adjustment unit further comprises a relay shaft connected at a first end thereof to the first shaft via a first pair of bevel gears and connected at a second end thereof to the second shaft via a second pair of bevel gears.

4. The heat seal device of claim 3, wherein the first shaft comprises:
    a base part on which the first male thread is formed; and
    a movable part on which a bevel gear of the first pair is mounted, the movable part being connected to the base part via a first bearing to be movable with respect to the base part between a first position where the first pair of the bevel gears is engaged with each other and a second position where the first pair of the bevel gears is disengaged from each other, and
    wherein the movable part and the first bearing are configured such that the movable part is rotatable together with the base part when the movable part is located in either the first position or the second position.

5. The heat seal device of claim 4, wherein the adjustment unit further comprises a positioning spring disposed to bias the movable part toward the first position.

6. The heat seal device of claim 3, wherein the relay shaft comprises:

a first end part on which a bevel gear of the first pair is mounted;

a second end part on which a bevel gear of the second pair is mounted;

an intermediate part located between the first end part and the second end part;

a first universal joint joining the first end part to the intermediate part; and a second universal joint joining the second end part to the intermediate part.

7. The heat seal device of claim 3, wherein the relay shaft and the second shaft are disposed to be moved by the drive unit in the facing direction with respect to the first shaft, wherein a bevel gear of the first pair is connected to the relay shaft via a relay bearing which is disposed not to be moved by the drive unit, and wherein the relay shaft and the relay bearing are configured such that the relay shaft is rotatable together with the bevel gear of the first pair when the relay shaft is located in any position within a range of movement thereof.

8. The heat seal device of claim 2, wherein the adjustment unit further comprises a handle for being operated to rotate the first shaft.

9. The heat seal device of claim 1, wherein the adjustment unit is configured to move the second seal unit in a same direction as the first seal unit and by a same distance as the first seal unit in accordance with the movement of the first seal unit.

* * * * *